Aug. 12, 1947.  J. F. VINCENT  2,425,581
STRETCHWRAPPING DEVICE
Filed Sept. 5, 1945
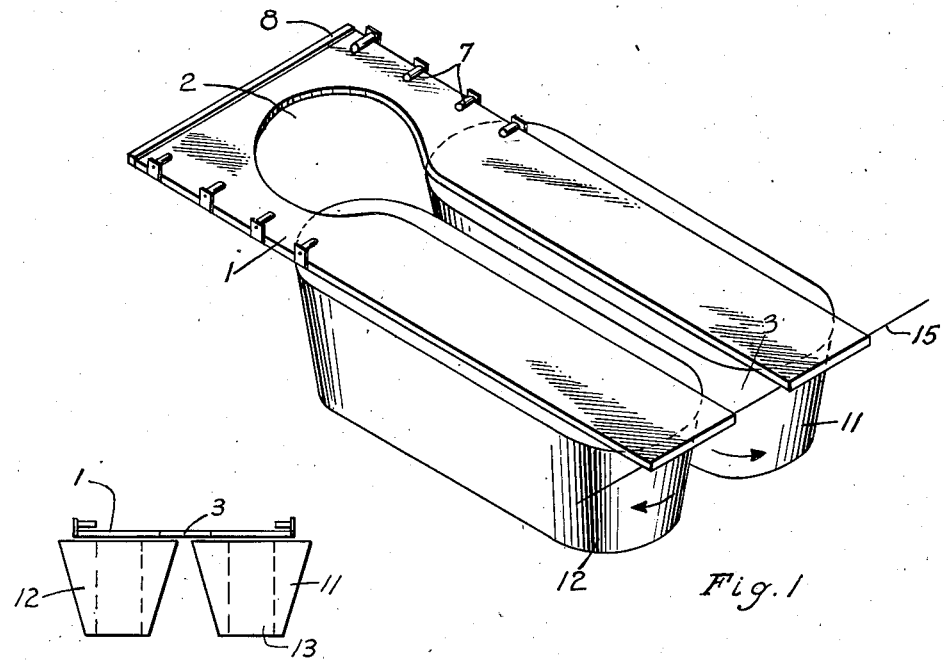
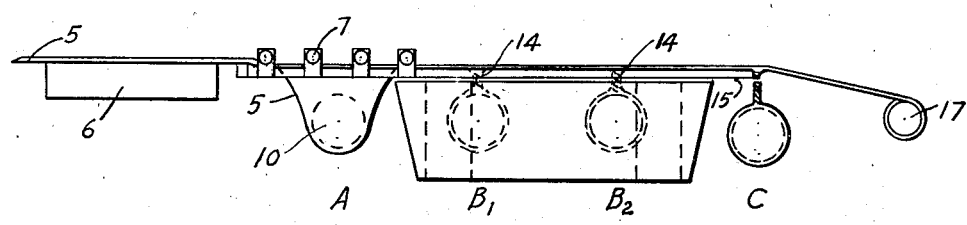
INVENTOR.
JOSEPH F. VINCENT.
BY
R. H. Waters Patented Aug. 12, 1947

2,425,581

UNITED STATES PATENT OFFICE 2,425,581

STRETCHWRAPPING DEVICE

Joseph F. Vincent, Akron, Ohio, assignor to Wingfoot Corporation, Akron, Ohio, a corporation of Delaware Application September 5, 1945, Serial No. 614,549

2 Claims. (Cl. 18—19)

This invention relates to a device for wrapping an object in a thermostretchable film by stretching the film as the object is enclosed in it, such general method of wrapping being known in the trade as "stretchwrapping." The device includes means for heating a film and for holding the film during the stretching operation and, more particularly, comprises belts for rolling the object after it has been wrapped to twist the film and seal it around the wrapped object.

The invention will be more fully explained in connection with the accompanying drawing, in which:

Fig. 1 is a view of the equipment in perspective;

Fig. 2 is an end view of the device; and

Fig. 3 is a side view showing how the equipment is utilized.

The device comprises a table 1 with a large opening 2 near one end of it, and extending from this opening an elongated opening 3 which extends from the opening 2 to the opposite end thereof. The heated film is brought over the opening 2, and here the object to be wrapped is pushed down against the film until the whole of the object is below the level of the table, and then by twisting, the object is entirely enclosed in the film, and the enclosing film is sealed off with a pigtail. The invention may be used for wrapping soap; fruits and vegetables, such as oranges, tomatoes, eggplant, etc.; and objects of irregular shape, such as small dolls and the like or any object which is adapted to being wrapped by such stretchwrapping. Although the device as shown in the drawing is designed particularly for hand operation, the principle is applicable to machines for automatic wrapping.

To operate the device, the film 5 (Fig. 3) is heated by being passed over the hot plate 6. From here the heated film passes over the table 1. As the object is being wrapped, there is a tendency for the edges of the film to be sucked into the opening 2, and the rollers 7 are designed to prevent this. Tenter clips or other holding means may be used for this purpose. The sponge rubber 8 along the edge of the table nearest the opening 2 prevents the film from being drawn down into the opening from this direction. The object 10 is pushed down through the opening 2 which is covered by the heated film; and in doing so, it stretches the area of the film which covers the opening. This results in a bag-shaped stretching of the film as illustrated at the position A in Fig. 3.

As the film moves forward, the object is brought between the belts 11 and 12, which are composed of sponge rubber or other resilient material united to a canvas or other suitable base and supported on vertical rollers 13. These belts taper downwardly, and the film supports the object between them. Suitable means (not shown) is provided for moving the belts in the directions indicated by the arrows (Fig. 1). The belt-driving means moves one of the belts at a greater speed than the other, and this rolls the object 10 between the belts and twists the portion of the film which supports the object. Fig. 3 shows two views of the object as it is being twisted between the belts. In the view $B_1$ there is only a partial twist at 14. $B_2$ shows the twist 14 more nearly completed.

As the film continues to move over the table, the twist is completed; and as the twisted portion of the film moves against the hot wire 15, the twisted film is severed, and the wrapping of the object is completed. The wire 15 may be heated electrically or by other suitable means. The view C in Fig. 3 shows the completed object 10 entirely enclosed in the film which is brought together in a twisted pigtail. The unused film is rolled up at 17.

The film may be drawn over the table by winding it onto the roller 17 or by any other suitable means. Rollers or other film-holding means may be located along both sides of the table 1 throughout its entire length if desired. The belts may have any surface contour. If the machine is designed for the wrapping of only one object, the surfaces of the belts may be designed to best conform to this object. Any heat-stretchable film may be used, such as rubber hydrochloride film or the like.

Modifications in the equipment may be utilized without departing from the invention which is defined in the accompanying claims.

What I claim is:

1. Stretchwrapping equipment which includes a table with an opening therein for the passage therethrough of an object pushed against film which covers the opening, and extending from the opening to one edge of the table an elongated opening, and adjacent said elongated opening and toward opposite sides thereof two continuous belts of resilient material for pressure against an object wrapped in the aforesaid film, said belts at the elongated opening being adapted for continuous movement away from the first-mentioned opening at different rates of speed so as to twist the object enclosed in the film.

2. Apparatus for stretchwrapping an object in a film of thermostretchable material which comprises a heating plate, a table with a relatively large opening therein, and extending from the large opening in the direction away from the heating plate an elongated opening which connects the large opening with the edge of the table away from the heating plate, toward opposite sides of the elongated opening two continuous sponge belts adapted for movement away from the heating plate at different speeds, and at the end of the table near the end of said elongated opening and across the opening a hot wire on the same side of the table as the belts to sever film brought in contact therewith.

JOSEPH F. VINCENT.

REFERENCES CITED

The following references are of record in the file of this patent:

UNITED STATES PATENTS

| Number | Name | Date |
|---|---|---|
| 2,232,783 | Hausheer | Feb. 25, 1941 |
| 2,289,668 | Mallory | July 14, 1942 |
| 2,301,106 | Brown | Nov. 3, 1942 |
| 2,312,049 | Pfeiffer | Feb. 23, 1943 |
| 398,015 | Williams | Feb. 19, 1889 |
| 867,176 | Warwick | Sept. 24, 1907 |
| 1,805,306 | Clark et al. | May 12, 1931 |
| 2,047,486 | Meyer-Jagenberg | July 14, 1936 |